United States Patent [19]

Beavers et al.

[11] Patent Number: 4,636,442
[45] Date of Patent: Jan. 13, 1987

[54] LAMINATED STRUCTURES OF POLYETHYLENE TEREPHTHALATE AND ELASTOMERIC COPOLYESTERETHERS

[75] Inventors: Randy S. Beavers; Finley E. McFarlane; Harry R. Musser; Freddie A. Shepherd, all of Kingsport, Tenn.

[73] Assignee: Eastman Kodak Company, Rochester, N.Y.

[21] Appl. No.: 786,433

[22] Filed: Oct. 11, 1985

[51] Int. Cl.[4] .................. B32B 27/08; B32B 27/36
[52] U.S. Cl. .................................................. 428/480
[58] Field of Search .................. 428/480, 482, 413; 524/765; 264/22; 525/481

[56] References Cited

U.S. PATENT DOCUMENTS 4,349,469 9/1982 Davis et al. ...................... 524/765
4,476,189 10/1984 Posey et al. .................. 428/480 X Primary Examiner—Thomas J. Herbert
Attorney, Agent, or Firm—John F. Stevens; William P. Heath, Jr.

[57] ABSTRACT

Disclosed is multi-layered sheet material comprising a layer of polyethylene terephthalate and a layer of an elastomeric copolyesterether. This sheet material is useful in packaging applications where resistance to flex cracking is important.

10 Claims, No Drawings

LAMINATED STRUCTURES OF POLYETHYLENE TEREPHTHALATE AND ELASTOMERIC COPOLYESTERETHERS

DESCRIPTION

1. Technical Field

This invention relates to multi-layered sheet material comprising a layer of polyethylene terephthalate (PET) and a layer of an elastomeric copolyesterether. This sheet material is useful in packaging applications where resistance to flex cracking is important.

2. Background Information

Thin gauge oriented polypropylene and oriented nylon are currently used to package certain food items. Oriented polypropylene is used in those applications where high barrier to moisture migration is a requirement while oriented nylon is used where gas barrier (oxygen and carbon dioxide) is a requirement. Biaxially oriented PET could be used in some of these applications; but the flex cracking resistance, as measured by pinhole formation, is very poor. For example, under the test conditions of ASTM F-392, oriented polypropylene exhibits 0–4 pinholes, oriented nylon 10–15, and oriented PET 100–120 pinholes. This poor resistance to flex cracking of PET precludes its use in many food packaging applications.

It has now unexpectedly been found that the flex cracking resistance of polyethylene terephthalate film or sheet material can be improved by laminating thereto a layer of elastomeric copolyesterether. The laminated structure still maintains high gloss, tensile properties and barrier properties that are representative of biaxially oriented polyethylene terephthalate.

British Pat. No. 1,431,916 and foreign counterparts, and U.S. Pat. No. 3,907,926 relate to blends of polyester and polyesterethers, but do not disclose or suggest the layered structures claimed herein.

DESCRIPTION OF THE INVENTION

According to the present invention, there is provided a shaped article comprising a polyethylene terephthalate layer and a layer comprising an elastomeric polyesterether positioned in contact with the poly(ethylene terephthalate) layer, the polyesterether having an I.V. of about 0.8–1.5, a melting point above about 150° C. and being the reaction product of (a) 100 mol % of at least one aromatic or cycloaliphatic dicarboxylic acid having from 8 to 12 carbon atoms.

(b) about 75–96 mol % of an aliphatic or cycloaliphatic glycol having 2 to 10 carbon atoms, and (c) about 25–4 mol % of a polyether glycol having 2–4 carbon atoms between ether units and a molecular weight of about 200–3000.

The amount of elastomeric copolyesterether in the shaped article should be from about 5 to about 75 weight %, preferably about 10–60 weight % based on the total weight of the article.

The term "polyethylene terephthalate" as used herein includes copolymers thereof. Polyethylene terephthalate useful in preparing the thermoplastic articles of this invention includes (a) polymers wherein at least about 97% of the polymer contains repeating ethylene terephthalate units with any remainder being minor amounts of ester forming components, and (b) copolymers of ethylene terephthalate wherein up to about 10 mole percent of the copolymer is prepared from the monomer units of diethylene glycol; propane-1,3-diol; butane-1,4-diol; 1,4-cyclohexanedimethanol; neopentyl glycol and the like substituted for the glycol moiety in the preparation of the copolymer or isophthalic; dibenzoic, naphthalene 1,4- or 2,6-dicarboxylic; adipic; sebacic; diglycolic; and the like substituted for the acid moiety in the preparation of the copolymer.

In addition, the polyethylene terephthalate polymer can include various additives that do not adversely affect the polymer in use such as stabilizers, e.g., antioxidants or ultraviolet light screening agents, extrusion aids, additives designed to make the polymer more degradable or combustible, such as oxidation catalyst, as well as dyes or pigments.

The polyethylene terephthalate should have an inherent viscosity (0.5% concentration of polymer in a 40/60 weight percent solution of tetrachloroethane/phenol, respectively, at 25° C.) of at least 0.55, and preferably the inherent viscosity is at least about 0.7. Especially preferred polyesters include those in which essentially all of the ester-forming components are (1) terephthalic acid and ethylene glycol, or (2) terephthalic acid, at least 95 mole % ethylene glycol and up to 5 mole % 1,4-cyclohexanedimethanol. Such polyesters and their preparation are described in U.S. Pat. No. 3,733,909 which is incorporated herein by reference. These polyesters are also commercially available.

The polyethylene terephthalate is in the form of a thin layer or sheet, which may be produced by conventional extrusion methods, or conventional coextrusion methods wherein it is coextruded with the elastomeric polyesterether layer.

Typical aromatic or cycloaliphatic dicarboxylic acids having 8 to 12 carbon atoms useful in forming the elastomeric polyesterethers include terephthalic, isophthalic, naphthalene dicarboxylic, and 1,4-cyclohexane dicarboxylic acids, or combinations thereof.

Typical aliphatic or cycloaliphatic glycols having 2 to 10 carbon atoms useful in forming the copolyesterethers include those such as ethylene, propylene, 1,4-butanediol, 1,4-butanediol, neopentyl glycol, 1,6-hexanediol, 1,4-cyclohexanedimethanol, and 1,5-pentanediol, or combinations thereof.

Typical useful polyether glycols having 2–4 carbon atoms between ether units include polytetramethyleneether glycol, polyethylene ether glycol, and polypropylene ether glycol and combinations thereof.

Typical useful commercially available polyether glycols include Carbowax resins, Pluronics resins, and Niax resins.

Conventional polymerization techniques, well known to those skilled in the art, may be used in producing the polyesterethers used in this invention.

The preferred elastomer used to achieve enhanced flex crack resistance is a copolyesterether described in U.S. Pat. No. 4,349,469, incorporated herein by reference. Basically this is a copolyesterether based on 1,4-cyclohexanedicarboxylic acid, 1,4-cyclohexanedimethanol, and polytetramethyleneether glycol. Other useful copolyesters include commercially available resins such as the Hytrel copolyesters manufactured by DuPont and the copolyesters such as the Galflex polymers manufactured by GAF.

It should be understood that the total acid reactants should be 100 mole %, and the total glycol reactants should be 100 mole %.

The copolyesterethers of this invention may include a phenolic antioxidant that is capable of reacting with the polymer intermediates. This causes the antioxidant to become chemically attached to the copolyesterether and be essentially nonextractable from the polymer. Antioxidants useful in this invention should contain one or more of an acid, hydroxyl, or ester group capable of reacting with the reagents used to prepare the copolyesterether. It is preferred that the phenolic antioxidant be hindered and relatively nonvolatile. Examples of suitable antioxidants include hydroquinone, arylamine antioxidants such as 4,4'-bis(α,α-dimethylbenzyl)diphenylamine, hindered phenol antioxidants such as 2,6-di-tert-butyl-4-methylphenol, butylated p-phenyl-phenol and 2-(α-methylcyclohexyl)-4,6-dimethylphenol; bisphenols such as 2,2'-methylene-bis(6-tert-butyl-4-methylphenol), 4,4'-bis(2,6-di-tert-butylphenol), 4,4'-methylenebis(6-tert-butyl-2-methylphenol), 4,4'-butylene-bis(6-tert-butyl-3-methylphenol), methylenebis(2,6-di-tert-butylphenol), 4,4'-thiobis(6-tert-butyl-2-methylphenol), and 2,2'-thiobis(4-methyl-6-tert-butylphenol); tris phenols such as 1,3,5-tris(3,5-di-tert-butyl-4-hydroxyhydrocinnamoyl)-hexahydro-s-triazine, 1,3,5-trimethyl-2,4,6-tris(3,5-di-tert-butyl-4-hydroxybenzyl)benzene and tri(3,5-di-tert-butyl-4-hydroxyphenyl)phosphite; and tetrakis[methylene(3,5-di-tert-butyl-4-hydroxyhydrocinnamate)methane] which is commercially available from Geigy Chemical Company as Irganox 1010 antioxidant, is preferred. Preferably, the antioxidant is used in an amount of from about 0.1 to about 1.0, based on the weight of copolyesterether.

Conventional cross-linking agents may be used in the elastomeric polyesterethers, such as described in U.S. Pat. No. 4,349,469.

Shaped articles according to this invention include multi-layered sheet material having A-B-A, B-A-B, A-B-A-B-A or B-A-B-A-B arrangements wherein A is polyethylene terephthalate and B is elastomeric polyesterether. The sheet material may be coextruded in a conventional manner by coextruding through a series of plate dies to sequentially overcoat the appropriate materials in such a manner that the resulting structure is arranged in layers. Different relative extruder screw speeds and take-off rates permit a variety of different products to be made.

In making the five layer structure of this invention with an A-B-A-B-A arrangement, we split the flow of a primary 2½-inch extruder such that it could supply both the inner and outer layers (A). By use of conventional valving arrangements in the bypass line, relative control of the flow between the inner and outer layers may be obtained, thereby the thickness of the layers may be controlled. A stacked plate die arrangement is used to form the respective layers. For example a toroidol-distribution manifold such as that disclosed in Chapter 15 of *Polymers Blends*, Volume II and entitled "Co-Extruded Multi-Layer Polymer Films and Sheets" illustrated on page 133, FIG. 34 operates using the same principle as our stacked plate die arrangement.

Typical thickness of an A-B-A type structure may be as follows:
A—6 mil
B—5 mil
A—6 mil Typical A-B-A-B-A type structure may have similar thicknesses.

Although coextrusion of the structure is most preferred, one of the layers may be preformed and subsequently coated with the composition of the other layer(s) using conventional techniques.

The following examples are submitted for a better understanding of the invention. In the examples, the copolyesterether (PCCE) is a copolymer of 100 mole % 1,4-cyclohexanedicarboxylic acid having a trans isomer content of at least 70%, 91 mole % of 1,4-cyclohexanedimethanol, and 9 mole % polytetramethyleneether glycol having a molecular weight of 1000. Also, in the examples, film tensile properties are measured in accordance with ASTM D-882. Tear resistance data are generated in accordance with ASTM D-470. Oxygen transmission rates are determined using a Modern Controls Corporation OX-TRAN 100 series instrument. Flex resistance and pinhole determinations are measured using ASTM F-392 procedures; numerical values represent number of pinholes. Biaxial orientation on film samples is accomplished using conventional techniques. Film heat distortion temperature (HDT) is measured according to ASTM D1736.

EXAMPLE 1

(Control)

PET monolayer is extruded into 20 mil. film. This film is biaxially oriented 4X by 4X at 100° C. The film has the following properties:
Thickness—1.25 mils
Tensile Strength (m.d.)—34,500 psi
Tensile Strength (t.d.)—29,800 psi
Ult. Elongation (m.d.)—93%
Ult. Elongation (t.d.)—71%
Flexural Modulus (m.d.)—579,000 psi
Flexural Modulus (t.d.)—576,000 psi
Oxygen Transmission—6.31
cc-mil/100 in sq/24 hr/atm When this film is flexed on the Gelbo tester for 30 minutes, it develops 43 pinholes. After 1 hour, the quality of the film is such that there are too many pinholes to count.

EXAMPLE 2

(Control)

Another sample of film from Example 1 is biaxially oriented 4X by 4X at 100° C. and then heat set 1 minute at 150° C. While the flexural modulus increases to 600,000 psi in both the m.d. and t.d. and the oxygen transmission rate decreases to 5.31 cc-mil/100 in sq/24 hr/atm, the film when flexed 60 minutes is untestable due to excessive pinholes.

EXAMPLE 3

(Control)

A sample of PET is extruded and biaxially oriented by a tentor frame process. The film is oriented 3.5X by 3.5X and heat set at 180° C. The film has the following properties:
Thickness—0.9 mils
Density—1.393 g/cc
Tensile Strength (m.d.)—23,300 psi
Tensile Strength (t.d.)—30,000 psi
Ult. Elongation (m.d.)—116%
Ult. Elongation (t.d.)—102%
Flexural Modulus (m.d.)—621,000 psi
Flexural Modulus (t.d.)—696,000 psi Oxygen Transmission—4.95
cc-mil/100 in sq/24 hr/atm When this film is subjected to the Gelbo flex test for 1 hour, it develops 103 pinholes.

The three examples above demonstrate the very poor flex crack resistance of PET monolayer.

EXAMPLE 4

A coextruded film of the following structure is prepared:

PET (5 mil)/PCCE (7 mil)/PET (8 mil)

This 20 mil coextruded film, containing 35% (on a thickness basis) of an elastomeric copolyester is biaxially oriented 4X by 4X at 100° C. to give a film with the following properties:

Thickness—1.25 mils
Tensile Strength (m.d.)—27,600 psi
Tensile Strength (t.d.)—27,700 psi
Ult. Elongation (m.d.)—101%
Ult. Elongation (t.d.)—101%
Flexural Modulus (m.d.)—364,000 psi
Flexural Modulus (t.d.)—359,000 psi
Oxygen Transmission—9.4
cc-mil/100 in sq/24 hr/atm When this film is subjected to the Gelbo flex test for 1 hour, it only develops 5 pinholes.

EXAMPLE 5

A coextruded structure similar to that described in Example 4 is prepared and biaxially oriented. This structure has 42% (based on thickness) of the elastomeric PCCE. When this structure is flexed for 1 hour, it develops only two pinholes.

EXAMPLE 6

The following coextruded film structure is prepared:
PET (6 mil)/PCCE (7 mil)/PET (6 mil)

This particular sample contains 1% of a conventional denest aid. The physical properties of this biaxially oriented film are essentially the same as those in Example 4 while the pinholes after 1 hour in the prescribed test were 11 count.

EXAMPLE 7

An ABA structure with the following PET/PCCE ratio of 10% (based on thickness) is prepared and biaxially oriented:

PET (8 mil)/PCCE (2 mil)/PET (10 mil) While tensile properties and oxygen transmission rates are equivalent to preceding examples, the number of pinholes after 1 hour of flexing was 63.

EXAMPLE 8

A coextruded structure of the ABA type (PET/PCCE/PET) containing 35% (based on thickness) of PCCE is biaxially oriented and heat set at 180° C. for 2 minutes. The film has, after flex testing for 1 hour, 24 pinholes.

EXAMPLE 9

A coextruded structure of the BAB type (PCCE/PET/PCCE) containing 35% (based on thickness) of PCCE is biaxially oriented at 90° C. The film is flex tested for 1 hour and has 5 pinholes. This example shows that not only can one use a coextruded structure where the PET is the two outside layers but the PCCE may be the outside layers.

Example 4 illustrates the advantages of the coextruded structures over PET from a flex crack resistance standpoint without severe loss of PET properties. Example 6 demonstrates that the addition of denest aid does not adversely affect pinhole formation. Example 7 indicates that lowering the amount of the polyester elastomer PCCE, in the final structure gives structures which have less resistance to flex cracking. Example 8 demonstrates the resistance of coextruded structures containing 35% (based on thickness) of PCCE even when heat set.

Table 1 shows a comparison of PET with an inherent viscosity of 0.76. The "COEX" film is a coextruded three-layer PET/PCCE/PET construction with 33% (based on thickness) PCCE. Commercial products #1 and #2 are oriented polypropylene and oriented PET respectively. Examination of the table shows that the trilayer construction of this invention exhibits a good balance of barrier, tear resistance and flex crack resistance. Table 2 illutrates flex cracking resistance of more samples where the percent of PCCE is varied and Table 3 illustrates typical physical properties of the film.

TABLE 1

| | ASTM Method | Units | Oriented Film Properties | | | Commercial Product #1 | Commercial Product #2 |
| --- | --- | --- | --- | --- | --- | --- | --- |
| | | | PET | Coex #1 | Coex #2 | | |
| Film Thickness (after orient.) | | mils | 1.25 | 1.20 | 1.20 | 1.0 | 0.5 |
| Tensile Strength (MD/TD) | D-882 | $10^3$ psi | 36.5/37.7 | 26.2/25.4 | 25.0/25.4 | 25.7/33.8 | 36.3/39.0 |
| Break Elongation (MD/TD) | D-882 | % | 97/105 | 86/80 | 92/77 | 105/53 | 98/121 |
| Yield Strength (MD/TD) | D-882 | $10^3$ psi | 15.9/15.4 | 9.80/11.8 | 9.96/11.3 | 4.9/33.8 | 13.3/11.2 |
| Film Modulus (MD/TD) | D-882 | $10^5$ psi | 6.06/6.01 | 3.49/3.81 | 3.64/4.25 | 3.35/5.29 | 5.95/4.80 |
| MVTR | | **** | 1.65 | 2.31 | 1.92 | 0.32 | — |
| $CO_2$ Transmission Rate | | ***** | 41.1 | 49.17 | 43.31 | untst. | — |
| $O_2$ Transmission Rate (before flexing) | D-3985 | ****** | 5.37 | 7.604 | 6.984 | untst. | — |
| Flex-Crack Resistance 60 minutes | F-392 | pinholes | untst. | 14 | 17 | 2-5 | 120 |

*Heat set for 2 minutes at 180° C. forced-air oven
****MVTR (Moisture Vapor Transmission Rate) - gm. - mils/100 sq. in./24 hours
*****$CO_2$ - cc mil/100 sq. in. - 24 hour - atm.
******$O_2$ - cc mil/100 sq. in. - 24 hour - atm.
Note: PET and Coex films were biaxially oriented (4 × 4 at 100° C.)
Flex-crack resistance was determined by ASTM F392 which required flexing (Gelbo Flex-Tester) oriented film (8 × 11 inches) for a specific time and using a red dye to determine the number of pinholes in a 6 × 8 inch area.

TABLE 2

| Example | FILM THICKNESS AFTER ORIENTATION (Mils) | LAYER THICKNESS BEFORE ORIENTATION (Mils) | WT. % PCCE | *TRIREFRINGENCE (Average) | (MD-TD) | FLEX-CRACK RESISTANCE (30 Min.) | (60 Min.) |
|---|---|---|---|---|---|---|---|
| 10 | 1.25 | 9.8/4.0/8.0 | 15.1 | 1.5055 | 10.0 | 16.0 | ff** |
| 11 | 1.30 | 5.1/3.5/5.8 | 20.7 | 1.5044 | 6.0 | 17.8 | ff |
| 12 | 1.30 | 6.8/3.8/5.0 | 20.7 | 1.5005 | 3.0 | 19.0 | 38.8 |
| 13 | 1.25 | 6.0/6.0/7.5 | 26.6 | 1.5044 | 11.0 | 4.6 | 10.4 |
| 14 | 1.22 | 6.0/5.5/5.8 | 27.6 | 1.5057 | 9.0 | 3.2 | 14.4 |
| 15 | 1.20 | 8.8/6.0/5.8 | 26.5 | 1.5069 | −6.0 | 4.6 | 14.2 |
| 16 | 1.10 | 5.0/4.0/5.0 | 24.6 | 1.5013 | −1.0 | 17.4 | 41.6 |
| 17 | 1.10 | 4.8/4.3/4.0 | 28.4 | 1.5023 | −3.0 | 18.4 | 39.8 |
| 18 | 1.20 | 5.5/5.0/5.0 | 27.8 | 1.5036 | −1.0 | 10.4 | 17.0 |
| 19 | 1.20 | 6.0/4.5/6.0 | 23.4 | 1.5057 | 8.0 | 6.8 | 20.6 |
| 20 | 1.25 | 4.2/3.8/4.8 | 25.5 | 1.5060 | 10.0 | 12.2 | 32.0 |
| 21 | 1.25 | 4.3/4.0/4.8 | 26.3 | 1.5043 | 3.0 | 21.4 | 36.2 |
| 22 | 1.20 | 4.2/4.0/6.0 | 24.2 | 1.5051 | 6.0 | 22.2 | 55.8 |
| 23 | 1.18 | 7.8/7.0/8.3 | 26.1 | 1.5048 | 5.0 | 4.0 | 12.8 |
| 24 | 1.10 | 7.5/5.4/7.0 | 23.3 | 1.5075 | 6.0 | 4.2 | 21.0 |
| 25 | 1.10 | 5.0/4.0/4.5 | 25.5 | 1.5053 | 0.0 | 7.6 | 32.6 |
| 26 | 1.10 | 3.8/4.0/5.0 | 27.0 | 1.5063 | 2.0 | 4.2 | 26.6 |
| 27 | 1.10 | 8.0/3.5/5.3 | 17.7 | 1.5059 | 1.0 | 6.2 | 36.6 |
| 28 | 1.25 | Monolayer | 0.0 | 1.5834 | −2.0 | ff | ff |
| 29 | 1.25 | Monolayer | 0.0 | 1.5912 | 2.0 | ff | ff |
| 30 | 1.25 | Monolayer | 0.0 | 1.5948 | −1.0 | 30.4 | ff |

*Trirefringence - indicates uniformity of orientation; closest to 0 for MD-TD is most uniform.
**ff - film failure (shredded)

TABLE 3

| | METHOD | UNITS | Ex. 31 | Ex. 32 | Ex. 33 | Ex. 34 | Ex. 35 |
|---|---|---|---|---|---|---|---|
| Film Thickness (oriented) | | Mils | 1.25 | 1.22 | 1.20 | 1.20 | 1.18 |
| Film Layer Thickness | | Mils | 6/6/7.5 | 6/5.5/5.8 | 8.8/6/5.8 | 5.5/5/5/ | 7.8/7/8.3 |
| Weight % PCCE | | % | 26.6 | 27.6 | 26.5 | 27.8 | 26.1 |
| *Flex - Crack Resistance: | | | | | | | |
| 30 Minutes | F392 | pinholes | 5 | 3 | 5 | 10 | 4 |
| 60 Minutes | F392 | pinholes | 10 | 14 | 14 | 17 | 13 |
| Tensile Strength (MD/TD) | D882 | $10^3$ psi. | 25.4/23.8 | 28.0/23.8 | 26.2/25.4 | 25.0/25.4 | 30.5/26.3 |
| Break Elongation (MD/TD) | D882 | % | 86/75 | 92/84 | 86/80 | 92/77 | 90/71 |
| Break Stress (MD/TD) | D882 | $10^3$ psi. | 25.4/23.8 | 28.0/23.8 | 26.2/25.4 | 25.0/25.4 | 30.5/26.3 |
| Yield Stress (MD/TD) | D882 | $10^3$ psi. | 9.0/12.8 | 9.39/11.9 | 9.80/11.8 | 9.96/11.3 | 10.5/13.9 |
| Film Modulus (MD/TD) | D882 | $10^5$ psi. | 3.23/3.76 | 3.36/3.50 | 3.49/3.81 | 3.64/4.25 | 3.59/4.25 |
| Film Tear Propagation: (MD/TD) | D1938 | lb./in. | 89.8/75.3 | 71.8/75.3 | 62/89.9 | 45.7/61.2 | 75.9/85.5 |
| Permeability Properties: | | | | | | | |
| O2 | D3985 | *** | 8.253 | 7.828 | 7.604 | 6.984 | 7.884 |
| CO2 | TEC | *** | 57.60 | 58.61 | 49.17 | 43.31 | 59.23 |
| MVTR | TEC | **** | 2.67 | 2.83 | 2.31 | 1.92 | 3.02 |

*Flex-crack resistance is determined by ASTM-F392. Oriented film samples (5 each) are run on the Gelbo flex-tester for 30 and 60 minutes and using a red dye to determine the number of pinholes in a 6 × 8 inch area.
***O2 - cc mil/100 sq. in. - 24 Hr. - Atm.
***CO2 - cc mil/100 sq. in. - 24 Hr. - Atm.
****MVTR - gm. - mil/100 sq. in. - 24 Hr.

Generally the elastomeric polyesters useful for coextrusion with PET would have the following properties:
Flexural modulus—<60,000 psi
Tensile strength—>2,000 psi
Ultimate elongation—>150%
Heat of fusion—>1 cal/gm.

The coextruded structures of this invention normally have, when biaxially oriented, the following minimum film properties:
Flexural modulus—>60,000 psi
Tensile strength—>2,500 psi
Ultimate elongation—>50%

In the following two examples coextruded structures were prepared, oriented, and heat set on available tentor line equipment (used to make biaxially oriented PET).

EXAMPLE 36

A coextruded structure, ABA [PET/PCCE/PET] containing 29% PCCE, based on thickness, was drafted, tentored, and heat set (232° F.). The biaxial orientation was 3.5×3.5 and final film thickness was 1.2 mil. After flexing 1 hour the film exhibited 14 pinholes. The film had the following physical properties:
Tensile Strength, D882—26,000 psi
Break Elongation, D882—85%
Flexural Modulus, D882—350,000
Film HDT—100° C.

EXAMPLE 37

A coextruded structure, ABA (PET/PCCE/PET) containing 29% PCCE, based on thickness, was drafted, tentored, and heat set (285° F.). The biaxial orientation was 3.5×3.5 and final film thickness was 1.2 mil. After flexing 1 hour the film developed 17 pinholes. The physical properties were essentially the same as example 12 with the exception of the film HDT which was 115° C.

The above coextruded structures use a polyesterether, PCCE, which contains polytetramethylene oxide glycol as the polyether segment of the polyesterether.

In the following examples polyesterethers were prepared using polyethylene oxide glycols (trade name Carbowax ® as the polyether segment.

EXAMPLE 38

A copolyesterether based on cyclohexene dicarboxylic acid, 1,4-cyclohexanedimethanol, and modified with 8.9 mole % of Carbowax ® 1000 is prepared. This material exhibits a crystalline melting point of 211° C. Film prepared from this copolyesterether has a tensile strength (D882) of 4300 psi, an elongation @ breaks of 300%, and a flexural modulus (D882) of 28,000 psi. This copolyesterether is coextruded 30% based on thickness, with PET into an ABA structure where B is the copolyesterether, biaxially oriented 4×4 and heat set (250° F.). Upon flexing the coextruded structure exhibits 21 pinholes after 1 hour of test. Film properties of the coextruded structure are essentially those described in Example 11.

EXAMPLE 39

In this example a copolyesterether is prepared using as the polyether segment 14.5 mole % of Carbowax ® 600. The polyesterether has a melting point of 193° C. Film prepared from this copolyesterether has a tensile strength of 4,000 psi, an elongation of breaks of 440%, and flexural modulus of 19,000 psi. This copolyesterether is coextruded with PET to give the same structure as indicated in Example 14. After orientation the coextruded structure upon flexing for 1 hour had 31 pinholes. Again the coextruded film had tensile, elongation, and tear properties essentially the same as those in Example 11.

Where acids are specified herein in the formation of the polyesters or copolyesters, it should be understood that ester forming derivatives of the acids may be used rather than the acids themselves as is conventional practice. For example, dimethyl isophthalate may be used rather than isophthalic acid.

As used herein, the inherent viscosity (I.V.) is measured at 25° C. using 0.50 gram of copolyester per 100 ml. of a solvent consisting of 60 percent by weight phenol and 40 percent by weight tetrachloroethane.

Unless otherwise specified, all parts, percentages, ratios, etc. are by weight.

The invention has been described in detail with particular reference to preferred embodiments thereof, but it will be understood that variations and modifications can be effected within the spirit and scope of the invention.

I claim:

1. A shaped article comprising a poly(ethylene terephthalate) layer and a layer comprising an elastomeric polyesterether positioned in contact with said poly(ethylene terephthalate) layer, said polyesterether having an I.V. of about 0.8–1.5, a melting point above about 150° C. and being the reaction product of
   (a) 100 mol % of at least one aromatic or cycloaliphatic dicarboxylic acid having from 8 to 12 carbon atoms,
   (b) about 75–96 mol % of an aliphatic or cycloaliphatic glycol having 2 to 13 carbon atoms, and
   (c) about 25–4 mol % of polyether glycol having 2–4 carbon atoms between ether units and a molecular weight of about 200–3000.

2. A shaped article according to claim 1 wherein said polyesterether is positioned between two layers of poly(ethylene terephthalate).

3. A shaped article according to claim 1 wherein said dicarboxylic acid of said polyesterether comprises terephthalic acid, isophthalic acid, naphthalenedicarboxylic acid, or 1,4-cyclohexanedicarboxylic acid.

4. A shaped article according to claim 1 wherein said aliphatic or cycloaliphatic glycol of said polyesterether comprises ethylene glycol, diethylene glycol, 1,4-butanediol, 1,6-hexanediol, neopentyl glycol, 1,4-cyclohexanedimethanol, diethylene glycol or triethylene glycol.

5. A shaped article according to claim 1 wherein said polyesterether is the reaction product of
   (a) a dicarboxylic acid component comprising terephthalic acid, isophthalic acid, naphthalene dicarboxylic acid, or 1,4-cyclohexanedicarboxylic acid,
   (b) a glycol component comprising about 75 to about 96 mol % ethylene glycol, diethylene glycol, 1,4-butanediol, 1,6-hexanediol, neopentyl glycol, 1,4-cyclohexanedimethanol, diethylene glycol or triethylene glycol, and
   (c) a polyether glycol comprising about 25 to about 4 mol % polytetramethylene ether glycol.

6. A five-layered, shaped article according to claim 1 comprising alternating layers of poly(ethylene terephthalate) and polyesterether.

7. A shaped article according to claim 1 wherein said article is a film.

8. A shaped article according to claim 1 wherein said polyethylene glycol of said polyesterether comprises polytetramethyleneether glycol.

9. A five-layered, shaped article according to claim 8 comprising alternating layers of poly(ethylene terephthalate) and polyesterether.

10. A shaped article according to claim 8 wherein said article is a film.

* * * * *